US012182096B2

(12) United States Patent
Liu et al.

(10) Patent No.: US 12,182,096 B2
(45) Date of Patent: Dec. 31, 2024

(54) SYSTEMS AND METHODS FOR PROVIDING TENANT-DEFINED EVENT NOTIFICATIONS IN A MULTI-TENANT DATABASE SYSTEM

(71) Applicant: Zuora, Inc., Redwood City, CA (US)

(72) Inventors: Wei Liu, Beijing (CN); Weilei Chen, Beijing (CN); Chi Lap Hoang, Belmont, CA (US); Lukasz Andrzej Weber, San Jose, CA (US); Henning Schmiedehausen, Los Altos, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

(21) Appl. No.: 16/891,062

(22) Filed: Jun. 3, 2020

(65) Prior Publication Data

US 2020/0379973 A1 Dec. 3, 2020

Related U.S. Application Data

(60) Provisional application No. 62/856,727, filed on Jun. 3, 2019.

(51) Int. Cl.
*G06F 16/23* (2019.01)
*G06F 9/54* (2006.01)
(Continued)

(52) U.S. Cl.
CPC ......... *G06F 16/2358* (2019.01); *G06F 9/542* (2013.01); *G06Q 10/107* (2013.01); *H04L 51/42* (2022.05)

(58) Field of Classification Search
None
See application file for complete search history.

(56) References Cited

U.S. PATENT DOCUMENTS 8,713,043 B2 *  4/2014 Hess .................... G06F 16/242
                                                                707/769
9,165,036 B2 * 10/2015 Mehra ................ G06F 16/2358
(Continued)

OTHER PUBLICATIONS

Hasselmeyer et al.; "Towards holistic multi-tenant monitoring for virtual data centers"; 2010; 2010 IEEE/IFIP Network Operations and Management Symposium Workshops; pp. 350-356; doi: 10.1109/NOMSW.2010.5486528. (Year: 2010).*

*Primary Examiner* — Umut Onat
(74) *Attorney, Agent, or Firm* — Sheppard, Mullin, Richter & Hampton LLP

(57) ABSTRACT

Systems and methods for providing tenant-defined event notifications in a multi-tenant database system are provided. The method may include receiving a first event definition from a first tenant, defining a first business event trigger based on one or more first business object changes occurring to the tenant data of the first tenant; receiving particular database change events from a change data capture service, wherein each of the particular database change events represents a particular change to the tenant data for the plurality of tenants in the database; identifying one or more particular business object changes based on the particular database change events; comparing the first event definition against the one or more particular business object changes to determine whether the first business event trigger has been satisfied; and when the first event trigger has been satisfied, emitting a first business event.

20 Claims, 9 Drawing Sheets

(51) Int. Cl.
  *G06Q 10/10*   (2023.01)
  *G06Q 10/107*  (2023.01)
  *H04L 12/58*   (2006.01)
  *H04L 51/42*   (2022.01)

(56) References Cited

U.S. PATENT DOCUMENTS

| | | | |
|---|---|---|---|
| 9,436,701 B2* | 9/2016 | Wisman | G06F 21/6227 |
| 9,443,224 B2* | 9/2016 | Dunn | H04L 51/32 |
| 9,647,904 B2* | 5/2017 | Lissack | H04L 43/16 |
| 10,678,773 B2* | 6/2020 | Baker | G06F 16/2358 |
| 10,742,748 B2* | 8/2020 | De Lavarene | G06F 9/547 |
| 10,909,088 B2* | 2/2021 | Colrain | G06F 16/252 |
| 10,970,486 B2* | 4/2021 | Machado | G10L 15/22 |
| 2012/0223951 A1* | 9/2012 | Dunn | H04L 51/52 345/467 |
| 2012/0324419 A1* | 12/2012 | Roberts | G06Q 10/101 717/102 |
| 2013/0339400 A1* | 12/2013 | Pflughoeft | G06Q 10/101 707/803 |
| 2014/0280905 A1* | 9/2014 | Bryan | G06F 9/542 709/224 |
| 2014/0372513 A1* | 12/2014 | Jones | G06F 9/5072 709/203 |
| 2015/0195349 A1* | 7/2015 | Cardamore | H04W 4/70 709/201 |
| 2016/0034571 A1* | 2/2016 | Setayesh | H04L 43/16 707/738 |
| 2018/0157384 A1* | 6/2018 | Baneva | G06F 9/5077 |
| 2019/0065542 A1* | 2/2019 | Baker | G06F 16/273 |

\* cited by examiner

SYSTEMS AND METHODS FOR PROVIDING TENANT-DEFINED EVENT NOTIFICATIONS IN A MULTI-TENANT DATABASE SYSTEM

CROSS REFERENCE TO RELATED APPLICATION

The present application is a non provisional application of and claims the benefit of U.S. Provisional Patent Application Ser. No. 62/856,727 filed Jun. 3, 2019, entitled "The Ability To Define Any Events/Notifications In A Microservices Architecture," which is hereby incorporated by reference herein.

TECHNICAL FIELD

This disclosure pertains to multi-tenant computing systems. More specifically, this disclosure pertains to providing event notifications in multi-tenant database systems.

SUMMARY

A claimed solution rooted in computer technology overcomes problems specifically arising in the realm of computer technology. In general, one aspect disclosed features a multi-tenant computing system, comprising: a database comprising tenant data for a plurality of tenants; one or more hardware processors; and memory storing instructions that, when executed by the one or more hardware processors, cause the multi-tenant computing system to perform: receiving a first event definition from a customer device of a first tenant of the plurality of tenants, the event definition defining a first business event trigger based on one or more first business object changes occurring to the tenant data of the first tenant; receiving particular database change events from a change data capture service, wherein each of the particular database change events represents a particular change to the tenant data for the plurality of tenants in the database; identifying one or more particular business object changes based on the particular database change events; comparing the first event definition against the one or more particular business object changes to determine whether the first business event trigger has been satisfied; when the first event trigger has been satisfied, emitting a first business event; receiving a first notification definition from the customer device of the first tenant, the first notification definition defining a first notification trigger based on the first business event; and when the first notification trigger has been satisfied, performing a notification action.

Embodiments of the computing system may include one or more of the following features. In some embodiments, the first business event trigger specifies at least one of: the first tenant; the one or more first business object changes; and one or more parameter thresholds for each of the one or more first business object changes. In some embodiments, the first notification definition specifies at least one of: the first tenant; the first notification trigger; the notification action; and one or more of the first business events. In some embodiments, performing the notification action comprises: sending an email, wherein content of the email represents the first business event. In some embodiments, the instructions further cause the system to perform: providing an event definition application programming interface (API); and receiving, from the customer device of the first tenant, the first event definition over the event definition API. In some embodiments, the instructions further cause the system to perform: providing a notification definition application programming interface (API); and receiving, from the customer device of the first tenant, the first notification definition of a the first tenant over the notification definition API. In some embodiments, each particular change to the tenant data for the plurality of tenants in the database comprises at least one of: a row change in a table in the database; and a column change in the table in the database.

In general, one aspect disclosed features a method being implemented by a computing system including one or more physical processors and storage media storing machine-readable instructions, the method comprising: providing a database comprising tenant data for a plurality of tenants; receiving a first event definition from a customer device of a first tenant of the plurality of tenants, the event definition defining a first business event trigger based on one or more first business object changes occurring to the tenant data of the first tenant; receiving particular database change events from a change data capture service, wherein each of the particular database change events represents a particular change to the tenant data for the plurality of tenants in the database; identifying one or more particular business object changes based on the particular database change events; comparing the first event definition against the one or more particular business object changes to determine whether the first business event trigger has been satisfied; when the first event trigger has been satisfied, emitting a first business event; receiving a first notification definition from the customer device of the first tenant, the first notification definition defining a first notification trigger based on the first business event; and when the first notification trigger has been satisfied, performing a notification action.

Embodiments of the method may include one or more of the following features. In some embodiments, the first business event trigger specifies at least one of: the first tenant; the one or more first business object changes; and one or more parameter thresholds for each of the one or more first business object changes. In some embodiments, the first notification definition specifies at least one of: the first tenant; the first notification trigger; the notification action; and one or more of the first business events. In some embodiments, performing the notification action comprises: sending an email, wherein content of the email represents the first business event. Some embodiments comprise providing an event definition application programming interface (API); and receiving, from the customer device of the first tenant, the first event definition over the event definition API. Some embodiments comprise providing a notification definition application programming interface (API); and receiving, from the, customer device of the first tenant, the first notification definition of the first tenant over the notification definition API.

In general, one aspect disclosed features a non-transitory computer readable medium comprising instructions that, when executed, cause one or more processors to perform: providing a database comprising tenant data for a plurality of tenants; receiving a first event definition from a customer device of a first tenant of the plurality of tenants, the event definition defining a first business event trigger based on one or more first business object changes occurring to the tenant data of the first tenant; receiving particular database change events from a change data capture service, wherein each of the particular database change events represents a particular change to the tenant data for the plurality of tenants in the database; identifying one or more particular business object changes based on the particular database change events; comparing the first event definition against the one or more particular business object changes to determine whether the first business event trigger has been satisfied; when the first event trigger has been satisfied, emitting a first business event; receiving a first notification definition from the customer device of the first tenant, the first notification definition defining a first notification trigger based on the first business event; and when the first notification trigger has been satisfied, performing a notification action.

Embodiments of the non-transitory computer readable medium may include one or more of the following features. In some embodiments, the first business event trigger specifies at least one of: the first tenant; the one or more first business object changes; and one or more parameter thresholds for each of the one or more first business object changes. In some embodiments, the first notification definition specifies at least one of: the first tenant; the first notification trigger; the notification action; and one or more of the first business events. In some embodiments, performing the notification action comprises: sending an email, wherein content of the email represents the first business event. In some embodiments, the instructions further cause the one or more processors to perform: providing an event definition application programming interface (API); and receiving, from the customer device of the first tenant, the first event definition over the event definition API. In some embodiments the instructions further cause the one or more processors to perform: providing a notification definition application programming interface (API); and receiving, from the customer device of the first tenant, the first notification definition of the first tenant over the notification definition API. In some embodiments, each particular change to the tenant data for the plurality of tenants in the database comprises at least one of: a row change in a table in the database; and a column change in the table in the database.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

In multi-tenant database systems, tenants may be from different industries, have different scales, and desire notifications for different business events. Even for the same kind of business events, different triggering conditions may be required for different use cases. Furthermore, in a microservice architecture, there are many services managing various business objects. These conditions present several challenges.

In the past, if a tenant requested a notification of a certain type of business event, database designers would collect similar use cases, consider different scenarios, develop a functional design, and provide it to software engineers. The engineering team would then write code to define the event, emit notifications of the event accordingly, and test the operation of the events and notifications. A documentation team would be required to draft release notes and related documents.

In the microservices world, the above efforts are amplified, because each service team must separately implement the event/notification frameworks, and define and implement their own business events and notifications. Because these prior solutions require hard-coding the event/notification definitions, they require long delivery cycles. And with this inflexible approach, it is difficult to fulfill tenants' needs.

Embodiments of the disclosed technology provide systems and methods for providing tenant-defined event notifications in a multi-tenant database system. A multi-tenant database stores data for multiple tenants in the form of business objects. The system monitors low-level database changes, and translates those changes into business object changes.

Embodiments allow tenants to define any business events based on the business object changes. Embodiments also provide a common and reusable service for all application services in a microservice architecture. According to various embodiments, a tenant may access the database system through an event definition application programming interface (API) to define a business event that specifies one or more of the business objects stored in the database, as well as one or more actions to be performed responsive to changes in those business objects. When one or more of the specified business objects changes, the system performs the specified actions. For example, the system may email a notification to the tenant.

Embodiments of the disclosed technology may be implemented in a multi-tenant subscription billing system. Before describing embodiments of the disclosed technology in detail, an example multi-tenant subscription billing system is described. However, it should be appreciated that embodiments of the disclosed technology may be implemented in any database system.

Figure 1:
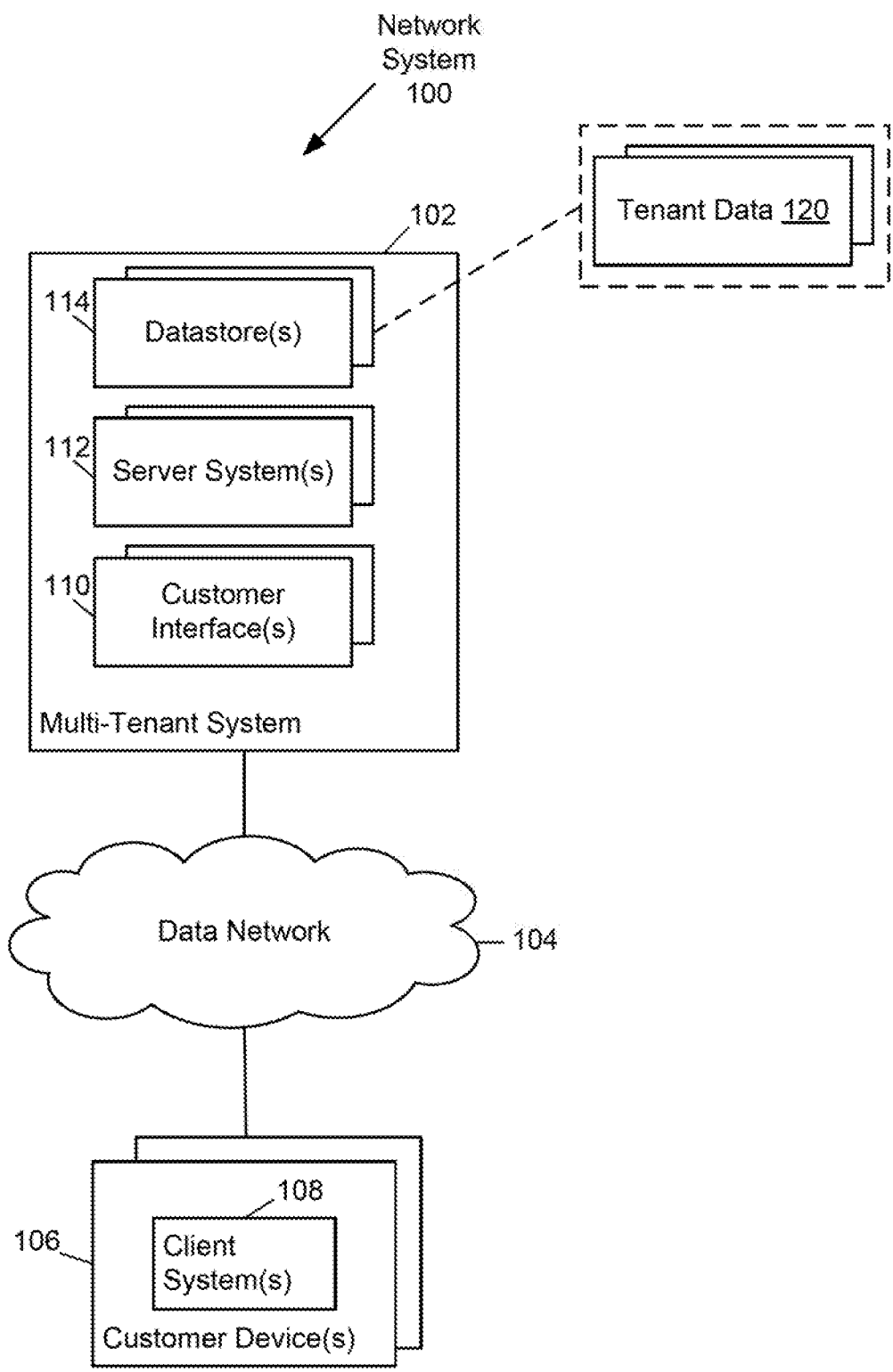
FIG. 1 is a block diagram of a network system for providing cloud-based software-as-a-service (SAAS) services of a multi-tenant system to multiple tenants according to some embodiments of the disclosed technology.

FIG. 1 is a block diagram of a network system 100 or providing cloud-based software-as-a-service (SAAS) services of multi-tenant system 102 to multiple tenants according to some embodiments of the disclosed technology. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, and datastores 114. Each of the client devices 106 includes a client system 108 that accesses the cloud-based SAAS services hosted by the multi-tenant system 102. In some embodiments, the client systems 108 may be operated by employees (e.g., administrator users) of the provider of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In me embodiments, the ti-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 112 may support load balancing when multiple tenants (and/or multiple customers of tenants) try to access the multi-tenant system 102 concurrently. Further, in some embodiments, each tenant may be associated with a subset of the total server systems 112 for load balancing, In some embodiments, tenant data 120 for each tenant may be stored in a logical store across one or more datastores 114. In some embodiments, each tenant uses a logical store that, is not assigned to any predetermined datastores 114. Each logical store may contain tenant data 120 that is used, generated and/or stored as part of providing tenant-specific business services or functions. In some embodiments, the datastores 114 may include relational database management systems (RDBMS) object-based database systems, and/or the like. In some embodiments, tenant data 120 may be stored across multiple datastores 114, with each datastore dedicated to a particular service (e.g., managing customer records, managing product and/or service consumption information managing billing information, managing payment information, and/or the like).

In some embodiments, the tenant data 120 may include subscription information, such as billing data and/or subscription status (e.g., active, canceled, suspended, re-activated). Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
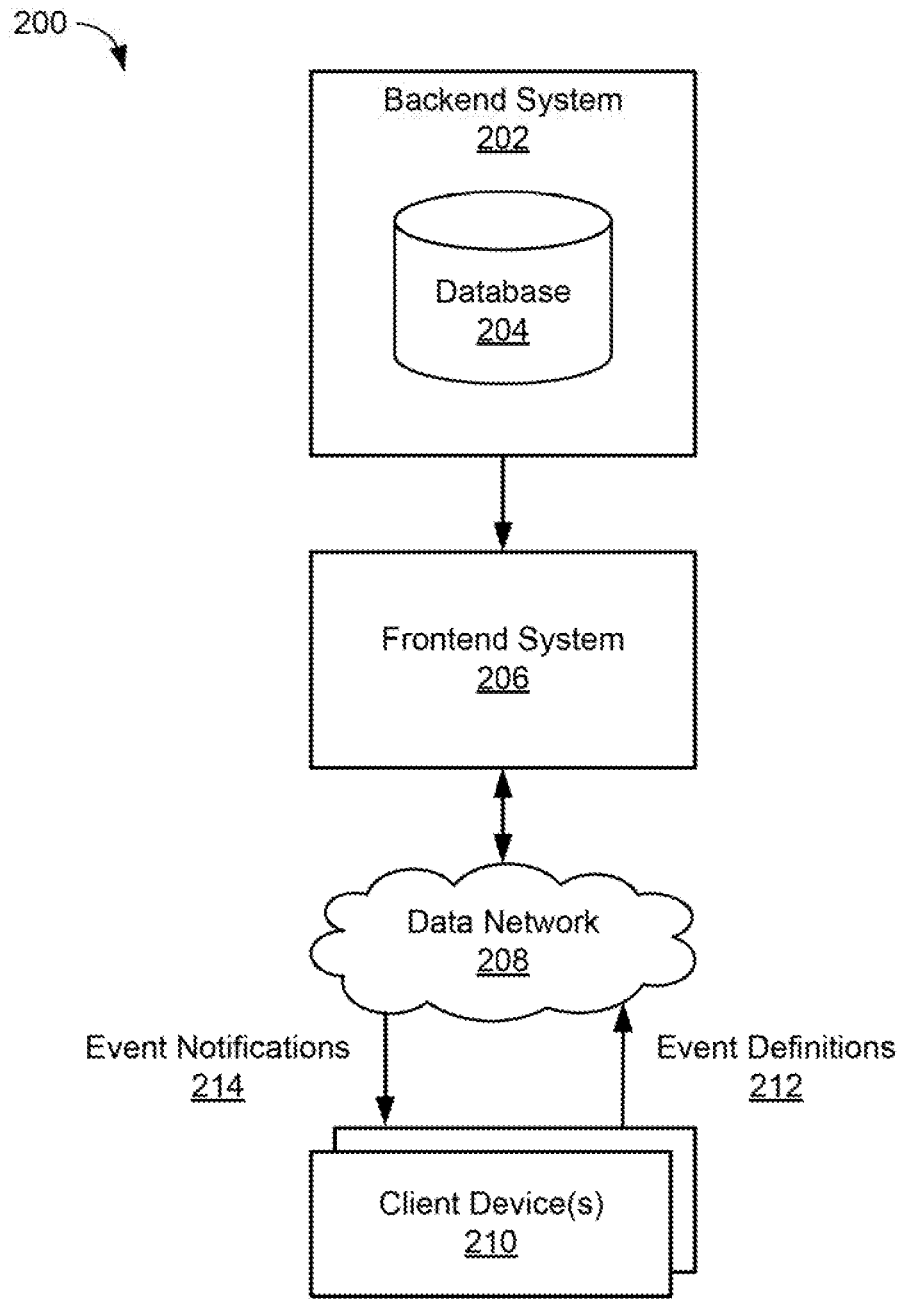
FIG. 2 is a block diagram illustrating a system for providing tenant-defined event notifications in a multi-tenant database system according to some embodiments of the disclosed technology.

FIG. 2 is a block diagram illustrating a system 200 for providing tenant-defined event notifications in a multi-tenant database system according to some embodiments of the disclosed technology. Referring to FIG. 2, the system 200 may include a backend system 202 that hosts a multi-tenant database 204. The multi-tenant database 204 may be implemented in a manner similar to that of the datastores 114 in the system 100 of FIG. 1. The system 202 may include a frontend system 206 that provides a tenant interface to the backend system 202.

The system 200 may include one or more client devices 210. The client devices 210 may be implemented in a manner similar to those of the customer devices 106 of the system 100 of FIG. 1. The client devices 210 may communicate with the frontend system 206 over a data network 208. The data network 208 may be implemented in a manner similar to that of the data network 104 of the system 100 of FIG. 1.

Tenants may employ the client devices 210 to create and edit event definitions 212 in the frontend system 206. When the event definitions 212 are triggered by changes in the multi-tenant database 204, the frontend system 206 may send one or more event notifications 214 to the client devices 210. These functions are now described in detail.

Figure 3:
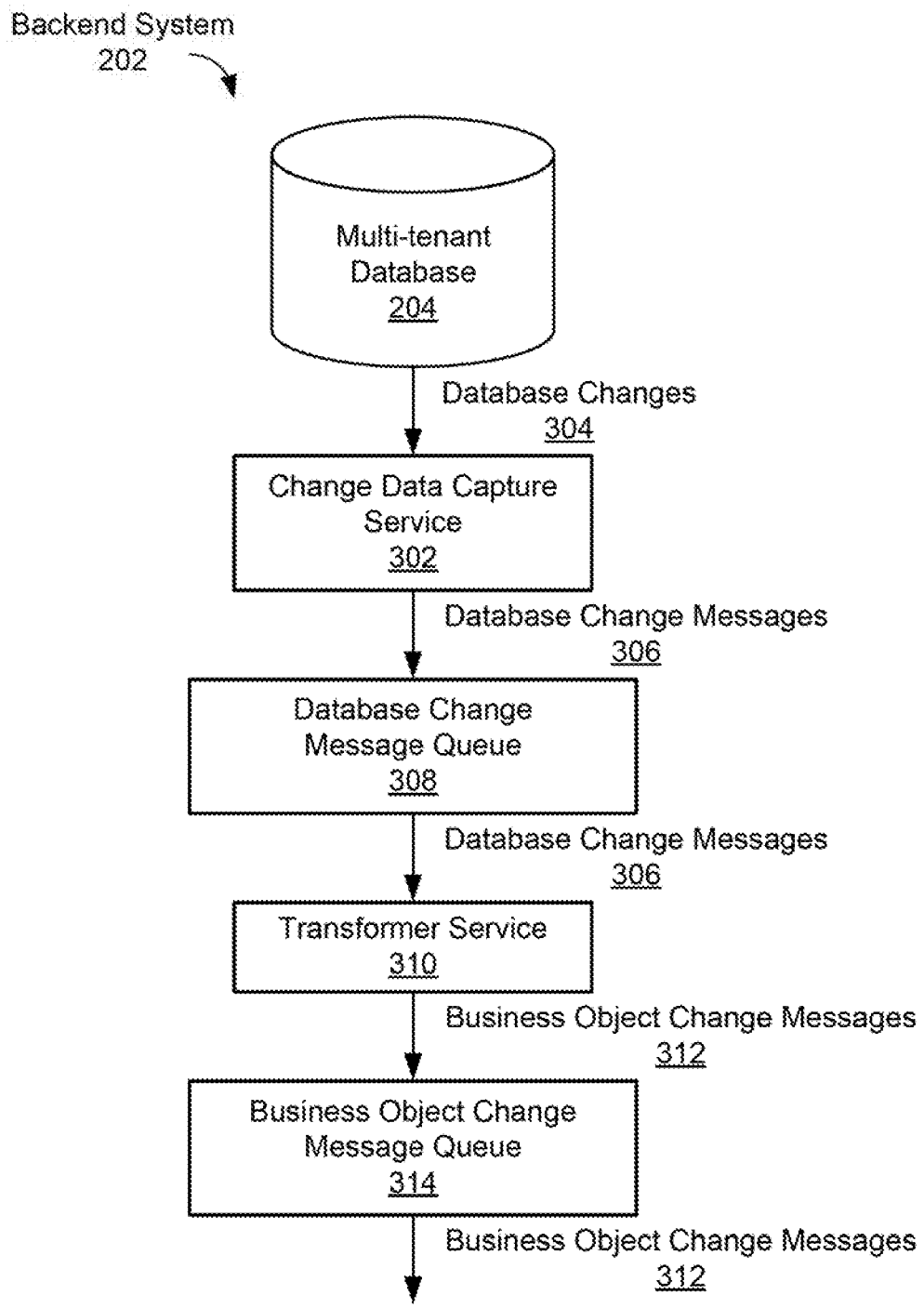
FIG. 3 is a block diagram illustrating the backend system of FIG. 2 according to some embodiments of the disclosed technology.

FIG. 3 is a block diagram illustrating the backend system 202 of FIG. 2 according to some embodiments of the disclosed technology. The backend system 202 may include the multi-tenant database 204, as described above. The multi-tenant database 204 may store business objects, which the tenants may use to create tenant-specific business objects. For example, in the multi-tenant billing system 100 of FIG. 1, the business objects may include Product, Subscription, Account, Invoice Payment, and the like.

The backend system 202 may include a change data capture service 302. The change data capture service 302 may capture low-level database changes 304 to the multi-tenant database 204, and may create a database change stream based on the database changes 304. The change data capture service 302 may place the database change messages 306 in a queue, for example, such as database change message queue 308.

Example database changes may include row changes, column changes, and the like. Each row or column change may represent a change on a single table row or column, respectively. For example, the change data capture service 302 may create a database change message 306 for each of the row changes. In some embodiments, because some tenants may be interested in the whole object, not only the changed properties, but also the unchanged ones, the change data capture service 302 may not filter out unchanged rows and columns.

One or more listeners may monitor the database change message queue 308. For example, the backend system 200 may include a transformer service 310 that monitors the database change message queue 308. The transformer service 310 may create a business object change stream based on the database changes 304 in the database, change message, queue 308. For example, the transformer service 310 may create a business object change message 312 based on one or more of the database changes 304 by translating the database change(s) 304 into a business object change according to domain specific logic, and packaging each business object change into one of the business object change messages 312. The transformer service 310 may place the business object change messages 312 in a business object change message queue 314. One or more listeners may monitor the business object change message queue 314. For example, one or more elements of the frontend system 206 may monitor the business object change message queue 314.

In some embodiments, a common message format is defined for the business object change messages 312. In these embodiments, any service may simply register its object model in the system 200, and pipe its own business object change messages 312 into the business object change message queue 314 for consumption by the system 200.

Figure 4:
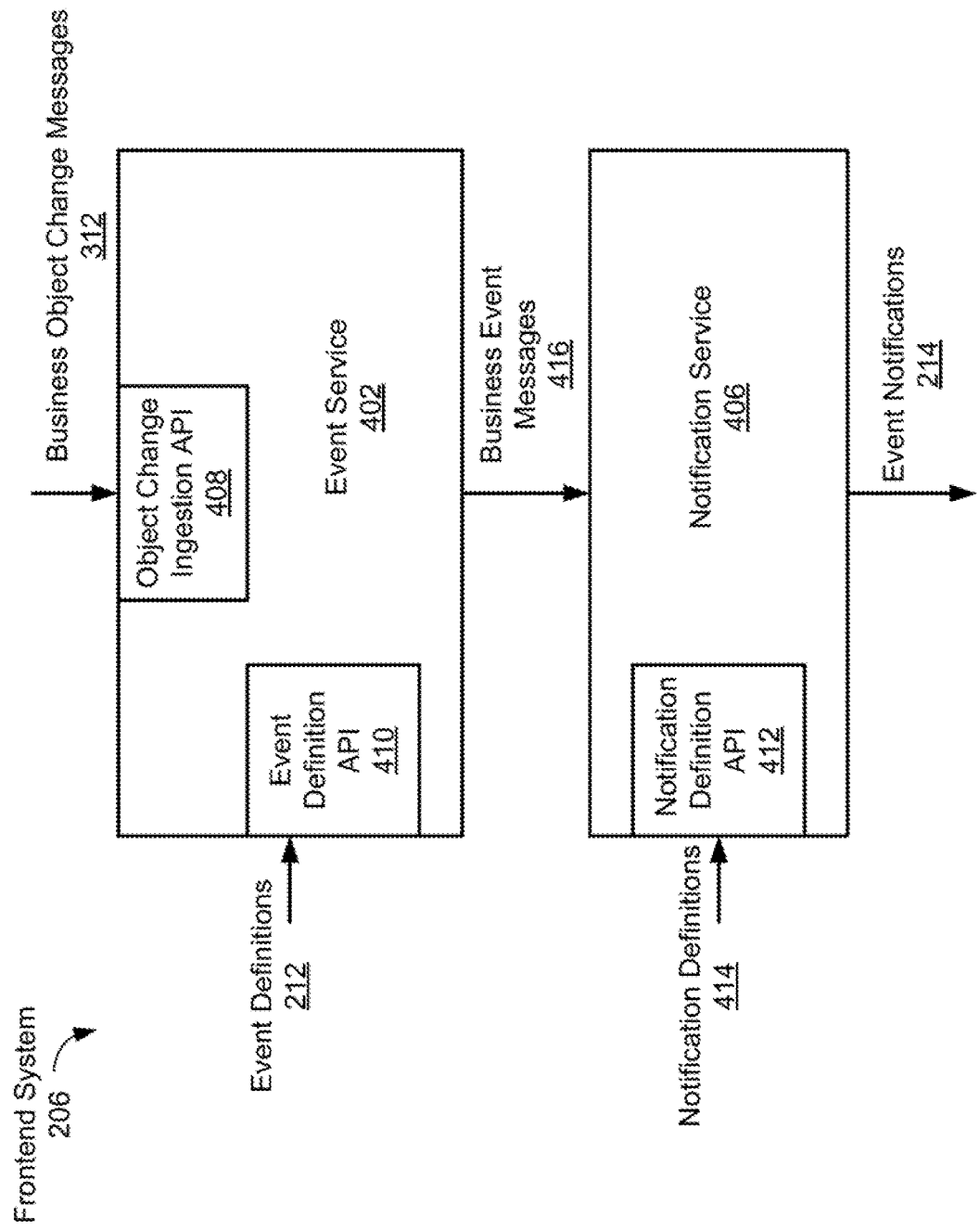
FIG. 4 is a block diagram illustrating the frontend system of FIG. 2 according to some embodiments of the disclosed technology.

FIG. 4 is a block diagram illustrating the frontend system 206 of FIG. 2 according to some embodiments of the disclosed technology. Referring to FIG. 4, the frontend system 206 may include an event service 402. The event service 402 may monitor the business object change message queue 314 provided by the backend system 202. The event service 402 may include an object change ingestion API 408 for receiving business object change messages 312 from the business object change message queue 314.

The event service 402 may receive event definitions 212. For example, the event service 402 may include an event definition API 410 that allows tenants to define, edit, and upload customized event definitions 212 according to their specific needs, and to select and edit one of a number of pre-defined event definitions. Each event definition 212 may define an event trigger that will trigger the emission of a corresponding business event, and only for that tenant. For example, an event trigger may specify one or more business object changes for a particular tenant, and may specify parameter thresholds for those changes. For example, an event trigger may specify that an invoice for the tenant is posted with an amount exceeding $1000.

Each event definition 212 may specify one or more actions to be performed when the business event is triggered.

For example, when one of the business object change messages 312 indicates a change to one or more of the database objects specified by an event definition 212 for a particular tenant, the system 200 will perform one or more of the actions specified by that event definition 212. For example, the system may generate one or more corresponding business event messages 416 for that tenant. Each business event message 416 may identify the particular tenant, the event trigger, a time and date the business event was triggered, and the like. Continuing the above example, when an invoice is posted with an amount exceeding $1000, the event service 402 may emit a corresponding business event in the form of a business event message 416 representing that event.

The frontend system 206 may include a notification service 406. The notification service 406 may receive the business event messages 416 generated by the event service 402. The notification service 406 may receive notification definitions 414. For example, the notification service 406 may include a notification definition API 412 that allows tenants to define and edit customized notification definitions 414 according to their specific needs, and to select and edit one of a number of pre-defined notification definitions. Each notification definition 414 may specify a particular tenant, a notification trigger, a notification method for providing a notification only to that particular tenant, and a payload for the notification. Each notification trigger may specify one or more particular business events for the tenant. Example notification methods may specify emailing a particular payload to the tenant, playing notification sounds for the tenant, and the like. Continuing the above example, when a business event message 416 is received indicating an invoice is posted for a particular tenant with an amount exceeding $1000, the notification service 406 may emit an event notification event that causes a bell ringing sound to play at one or more client devices 102 for that tenant.

Figure 5:
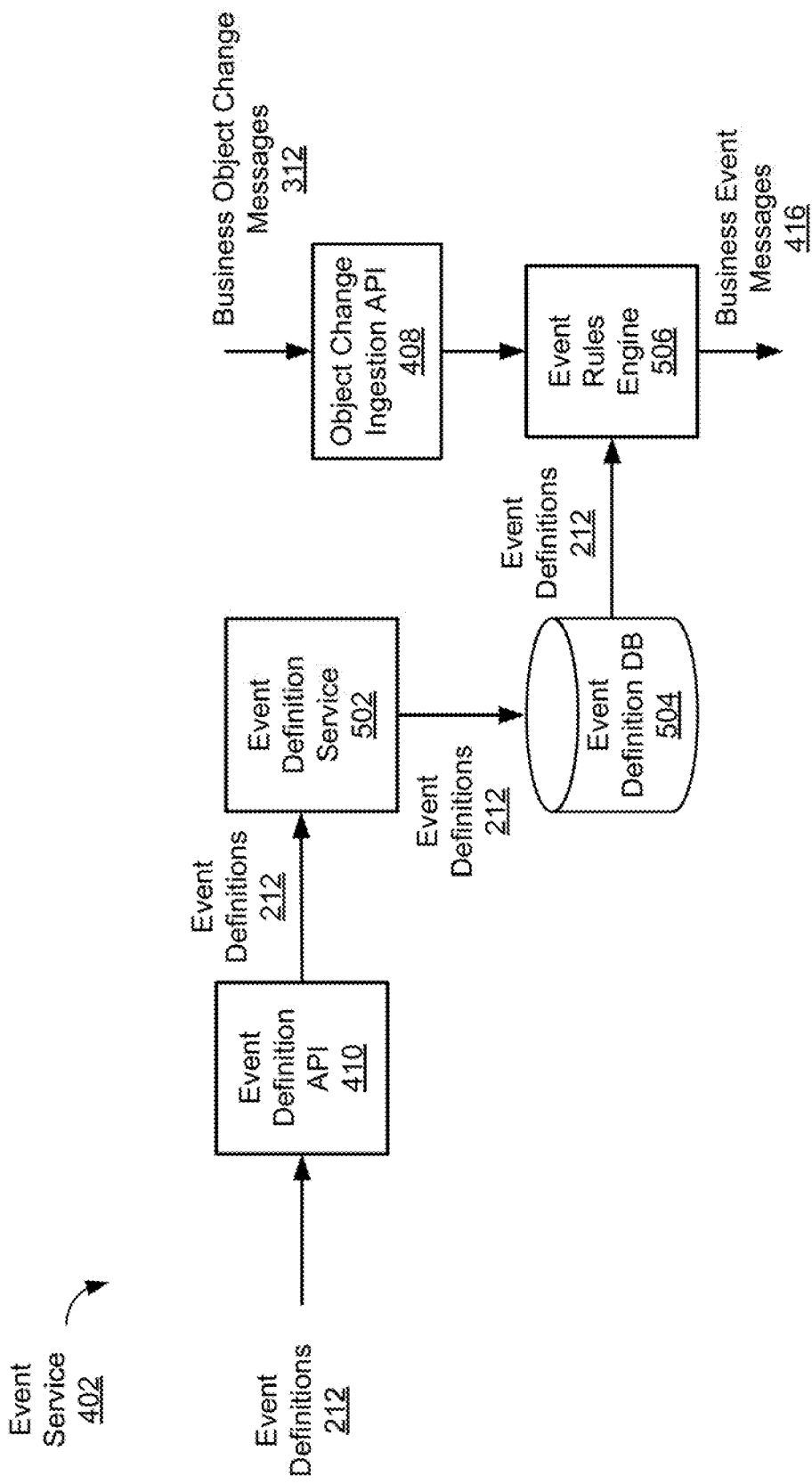
FIG. 5 is a block diagram illustrating the went service of FIG. 4 according to some embodiments of the disclosed technology.

FIG. 5 is a block diagram illustrating the event service 402 of FIG. 4 according to some embodiments of the disclosed technology. Referring to FIG. 5, the event service 402 may include the event definition API 410 to provide an interface to tenants for defining and editing event definitions 212. The event service 402 may include the object change ingestion API 408 of FIG. 4 for receiving the business object change messages 312.

The event service 402 r -lay include an event definition service 502. The event definition service 502 may provide applications for tenants for receiving, selecting, defining, and editing event definitions 212 via the event definition API 410. The event service 402 may include an event definition database 504 for storing the event definitions 212.

The event service 402 may include an event rules engine 506. The event rules engine 506 may receive the business object change messages 312 via the object change ingestion API 408. The event rules engine 506 may receive the event definitions 212 from the event definition database 504. The event rules engine 506 may compare the contents of the business object change messages 312 to the event definitions 212, and may generate business event messages 416 based on the comparison, for example as described elsewhere in this disclosure.

Figure 6:
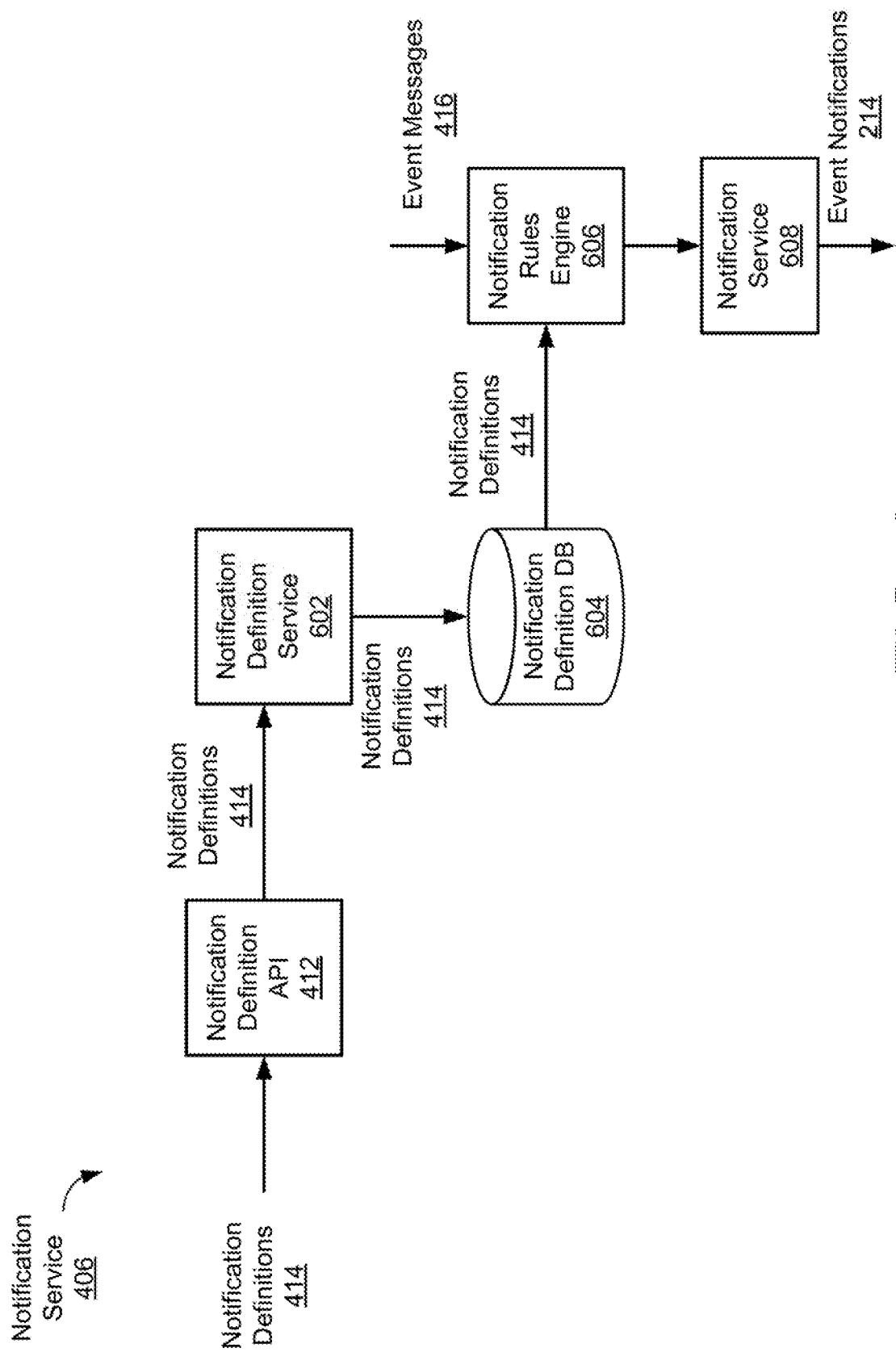
FIG. 6 is a block diagram illustrating the notification service of FIG. 4 according to some embodiments of the disclosed technology.

FIG. 6 is a block diagram illustrating the notification service 406 of FIG. 4 according to some embodiments of the disclosed technology. Referring to FIG. 6, the notification service 406 may include the notification definition API 412 to provide an interface to tenants for defining and editing notification definitions 414.

The notification service 406 may include a notification definition service 602. The notification definition service 602 may provide applications for tenants for receiving, selecting, defining, and editing notification definitions 414 via the notification definition API 412. The notification service 406 may include a notification definition database 604 for storing the notification definitions 414.

The notification service 406 may include a notification rules engine 606. The notification rules engine 606 may receive the business event messages 416 from the event service 402. The notification rules engine 606 may receive the notification definitions 414 from the notification definition database 604. The notification rules engine 606 may compare the business event messages 416 with the notification definitions 414, and may generate the event notifications 214 based on the comparison, for example as described elsewhere in this disclosure.

Figure 7:
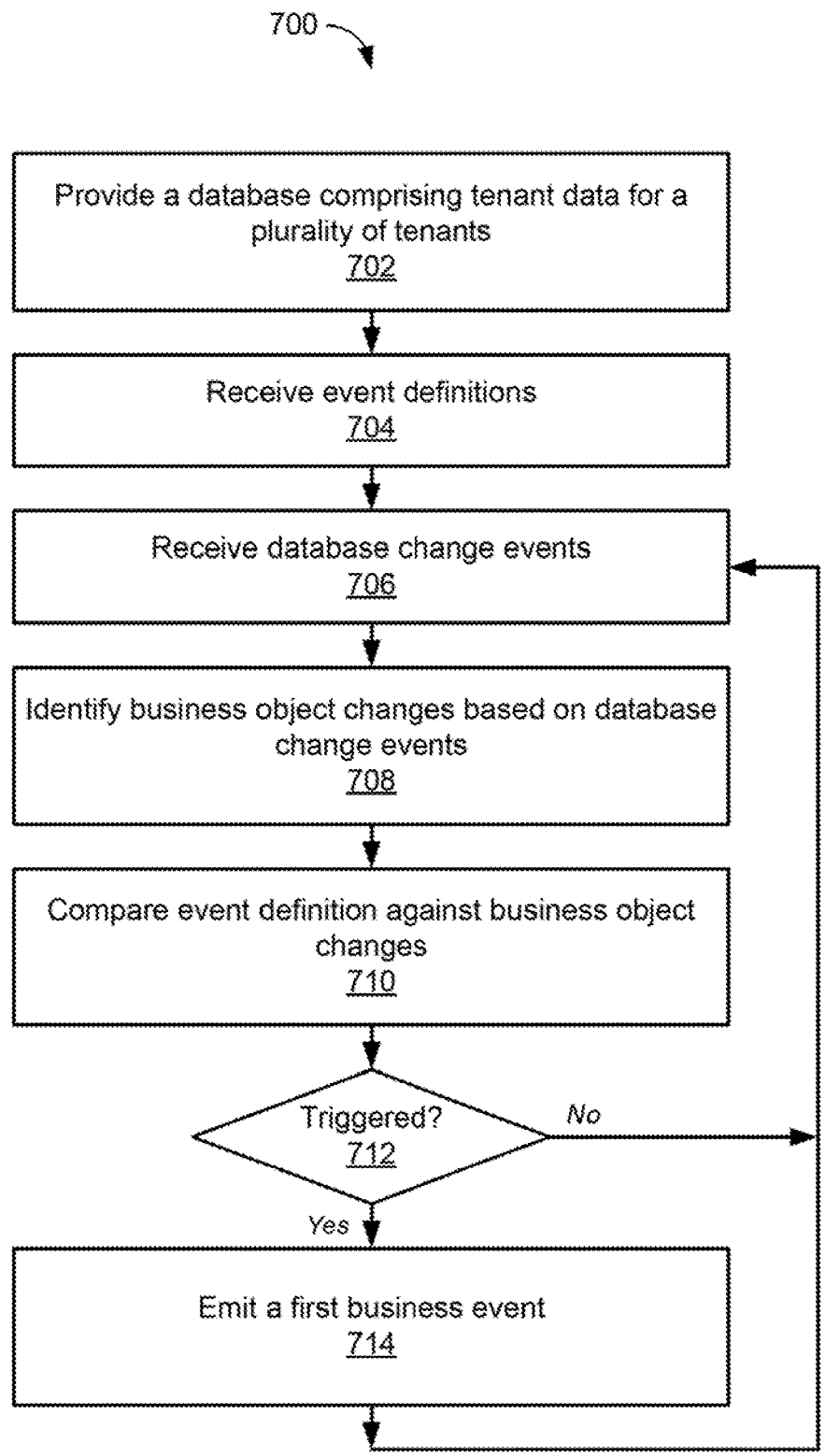
FIG. 7 is a flowchart illustrating a process for providing tenant-defined events in a multi-tenant database system according to some embodiments of the disclosed technology. Elements of the disclosed processes are presented in a particular order.

FIG. 7 is a flowchart illustrating a process 700 for providing tenant-defined events in a multi-tenant database system according to some embodiments of the disclosed technology. Elements of the disclosed processes are presented in a particular order. However, it should be understood that one or more of these elements may be performed in a different order, performed concurrently, or omitted, in various embodiments.

Referring to FIG. 7, the process 700 may include providing a database comprising tenant data for a plurality of tenants, at 702. For example, the tenant data may include database objects that represent the information described with reference to the system 100 of FIG. 1. The database may be implemented, for example, as one or more of the data stores 114 of FIG. 1, as the multi-tenant database 204 of F1G. 2, and the like, and combinations thereof.

Referring again to FIG. 7, the process 700 may include receiving event definitions, at 704. For example, the event definitions may be generated by tenants using the client devices 210 of FIG. 2 to access the event definition service 502 of FIG. 5 via the event definition API 410, as described above. Each event definition may define a business event trigger based on one or more business object changes occurring to the tenant data for a particular tenant.

Referring again to FIG. 7, the process 700 may include receiving database change events, at 706. Each database change event may represent a particular change to the tenant data in the database for the plurality of tenants. For example, referring to FIG. 3, the database change events may be implemented as the database changes 304 received by the change data capture service 302 from the multi-tenant database 204.

Referring again to FIG. 7, the process 700 may include identifying business object changes based on database change events, at 708. For example, referring to FIG. 3, the transformer service 310 may identify the business object changes based on the database change messages 306 generated by the change data capture service 302, and may package the business object changes in business object change messages 312.

Referring again to FIG. 7, the process 700 may include comparing the business object changes to the event definitions, at 710. For example referring to FIG. 5, the event rules engine 506 may compare the business object change messages 312 to the event definitions 212 stored in the event definition database 504 to determine whether a business event trigger for one or more of the event definitions 212 has been satisfied.

Referring again to FIG. 7, when a business event trigger for one or more of the event definitions 212 has been satisfied, at 712, the process 700 may include emitting one or more business events, at 714. For example, referring again to FIG. 5, the event rules engine 506 may generate a business event message 416 representing the business event.

Referring again to FIG. 7, after emitting the business event, or when no business event trigger is satisfied, the process 700 may continue with receiving additional database change events, at 706.

Figure 8:
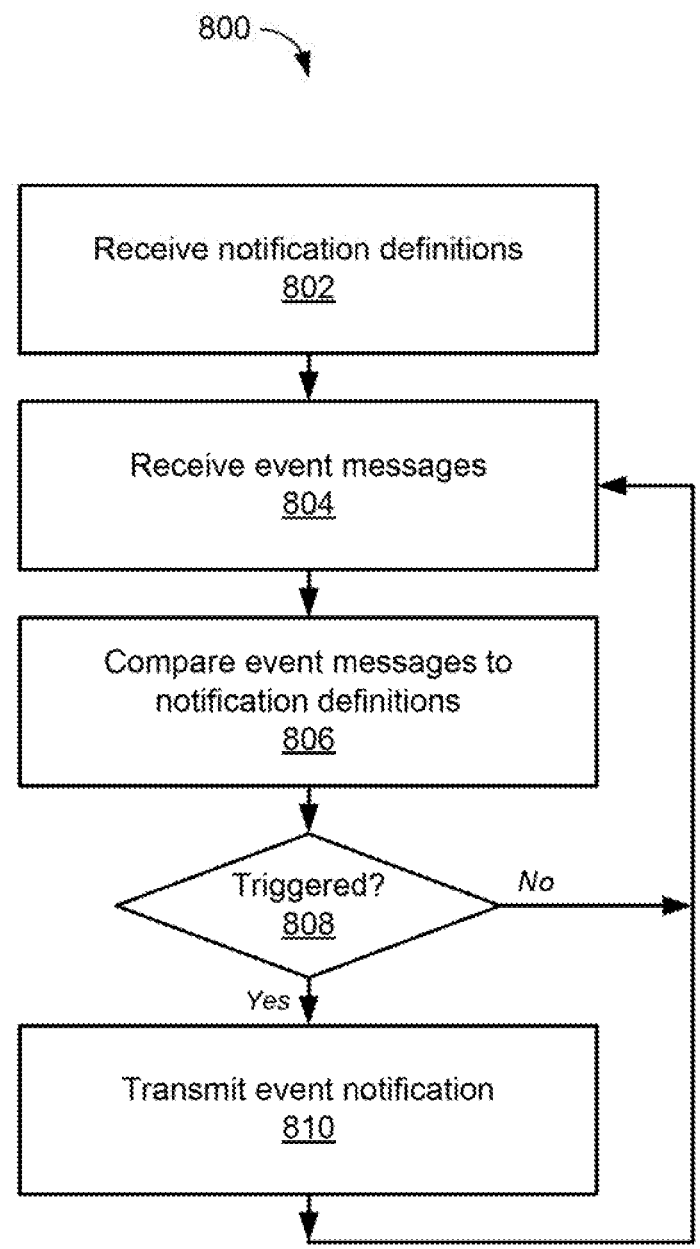
FIG. 8 is a flowchart illustrating a process for providing tenant-defined event notifications in a multi-tenant database system according tee some embodiments of the disclosed technology.

FIG. 8 is a flowchart illustrating a process 800 for providing tenant-defined event notifications in a multi-tenant database system according to some embodiments of the disclosed technology. Referring to FIG. 8, the process 800 may include receiving notification definitions, at 802. For example, the notification definitions may be generated by tenants using the client devices 210 of FIG. 2 to access the notification definition service 602 of FIG. 6 via the notification definition API 412, as described above.

Referring again to FIG. 8, the process 800 may include receiving event messages, at 804. For example, business event messages 416 may be generated by the event rules engine 506 of FIG. 5. The notification service 406 of FIG. 4 may receive the business event messages 416 from the event service 402.

Referring again to FIG. 8, the process 800 may include comparing the event messages to the notification definitions, at 806. For example, referring to FIG. 6, the notification rules engine 606 may compare the business event messages 416 to the notification definitions 414 stored in the notification definition database 604 to determine whether a notification trigger for one or more of the notification definitions 414 has been satisfied.

Referring again to FIG. 8, when a notification trigger for one or more of the notification definitions has been satisfied, at 808, the process 800 may include performing a notification action, at 810. For example, the notification service 608 of FIG. 6 may transmit an event notification 214, for example as described above. Continuing the example, and referring to FIG. 6, the notification rules engine 606, responsive to receiving the business event message 416 from the event rules engine 506, may prompt the notification service 608 to generate and emit one or more event notifications 214. An event notification 214 may be implemented as an email message addressed to a tenant. For example, when an AccountCreated event is triggered and the account status is 'Active,' the system may send an email with a certain email template to the tenant. If the EventContext is not sufficient, NotificationService may issue a registered callout to pull more data. As another example, one of the event notifications 214 may be implemented as a callout request to one or more of the tenant's systems.

Referring again to FIG. 8, after performing the notification action, or when no notification trigger is satisfied, the process may continue with receiving additional event messages, at 804.

Various embodiments provide several advantages over conventional systems. For example, various embodiments provide the ability to support events and notifications for any business events, thus effectively providing on-demand hooks for tenants to integrate with the system. As another example, various embodiments provide the ability for tenants to know exactly when and how an event is to be triggered and a notification sent out, whereas in conventional systems tenants would need to read articles in a knowledge center and test with various scenarios. And various embodiments provide flexibility in being able to meet different tenant's needs. For example, for the same type of invoice posted events, customers can send email notifications with different email templates according to the invoice amount.

Figure 9:
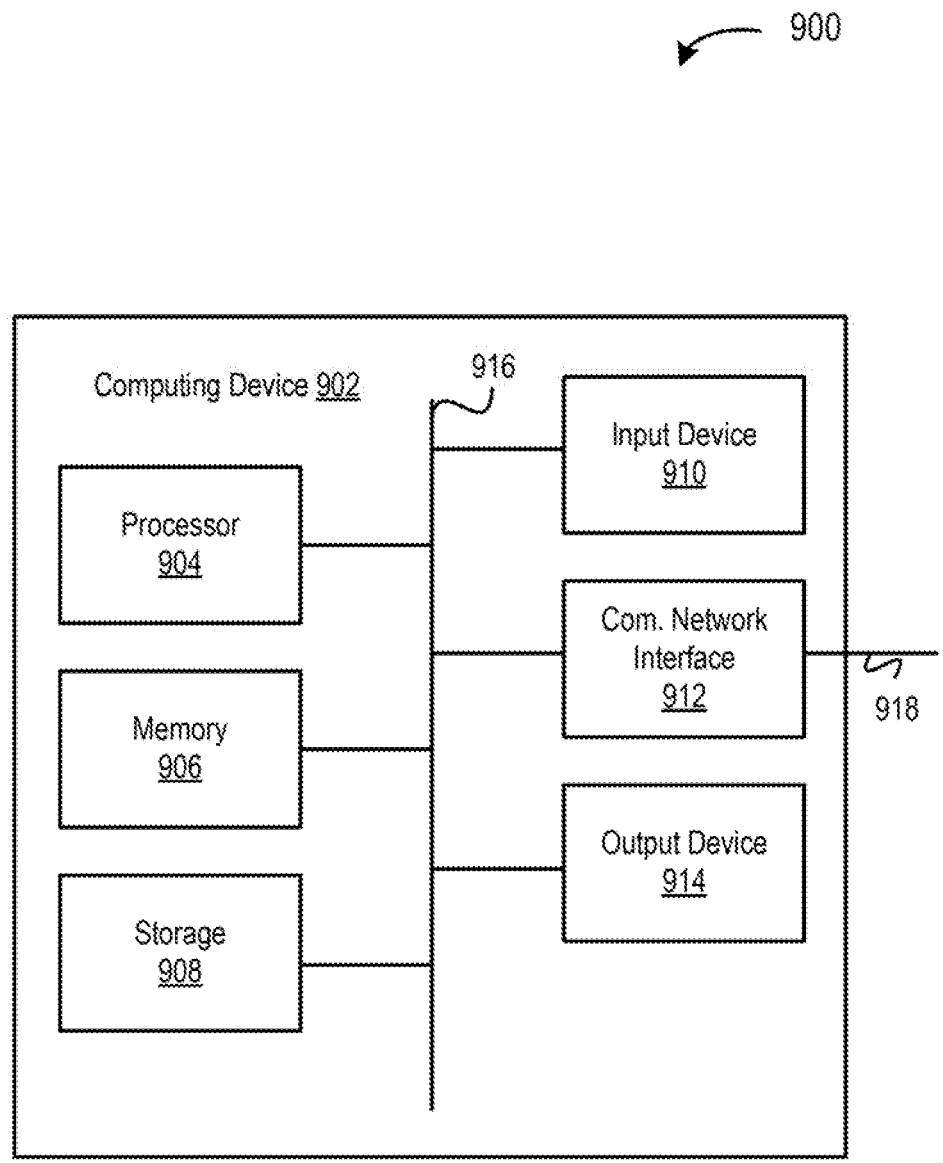
FIG. 9 is a block diagram illustrating an example computer system for implementing the features disclosed herein according to some embodiments.

FIG. 9 is a block diagram illustrating an example 900 of a computing device 902. Any of the systems, engines, datastores, and/or networks described herein may comprise an instance of one or more computing devices 902. In some embodiments, functionality of the computing device 902 is improved to the perform some or all of the functionality described herein. The computing device 902 comprises a processor 904, memory 906, storage 908, an input device 910, a communication network interface 912, and an output device 914 communicatively coupled to a communication channel 916. The processor 904 is configured to execute executable instructions (e.g., programs). In some embodiments, the processor 904 comprises circuitry or any processor capable of processing the executable instructions.

The memory 906 stores data. Some examples of memory 906 include storage devices, such as RAM, ROM RAM cache, virtual memory, etc. In various embodiments, working data is stored within the memory 906. The data within the memory 906 may be cleared or ultimately transferred to the storage 908.

The storage 908 includes any storage configured to retrieve and store data. Some examples of the storage 908 include flash drives, hard drives, optical drives, cloud storage, and/or magnetic tape. Each of the memory system 906 and the storage system 908 comprises a computer-readable medium, which stores instructions or programs executable by processor 904.

The input device 910 is any device that inputs data (e.g., mouse and keyboard). The output device 914 outputs data (e.g., a speaker or display). It will be appreciated that the storage 908, input device 910, and output device 914 may be optional. For example, the routers/switchers may comprise the processor 904 and memory 906 as well as a device to receive and output data (e.g., the communication network interface 912 and/or the output device 914).)

The communication network interface 912 may be coupled to a network (e.g., network 108) via the link 918. The communication network interface 912 may support communication over an Ethernet connection, a serial connection, a parallel connection, and/or an ATA connection. The communication network interface 912 may also support wireless communication (e.g., 902.11 a/b/g/n, WiMax, LTE, WiFi). It will be apparent that the communication network interface 912 may support many wired and wireless standards.

It will be appreciated that the hardware elements of the computing device 902 are not limited to those depicted in FIG. 9. A computing device 902 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 904 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant computing system configured to enable each tenant of a plurality of tenants of the multi-tenant computing system to create tenant-specific business event definitions and notification triggers based on changes to tenant data specific to the tenant, the multi-tenant computing system comprising:

a database comprising tenant data for a plurality of tenants, the tenant data including first tenant data associated with a first tenant of the plurality of tenants;
one or more hardware processors; and
memory storing instructions that, when executed by the one or more hardware processors, cause the multi-tenant computing system to perform:
  providing a first interface configured to receive a first business event definition from a customer device of the first tenant, the first business event definition defining a first business event trigger based on one or more first business object changes identified by the first tenant and associated with the first tenant data, the one or more first business object changes defining an occurrence of a first business event associated with the first tenant, the first business event definition being tenant-specific to only the first tenant, the first business event trigger including one or more logical operations involving the one or more first business object changes;
  streaming by a change data capture service a first stream portion of first particular database change events having occurred in the database to a database change event queue;
  accessing by a transformer service the database change event queue to evaluate the first particular database change events to determine whether a first particular business object change has occurred, one or more of the first particular database change events indicating whether the first particular business object change has occurred;
  identifying by the transformer service the first particular business object change based on the one or more of the first particular database change events;
  streaming the first particular business object change to a business object change message queue;
  streaming by the change data capture service a second stream portion of second particular database change events having occurred in the database to the database change event queue;
  accessing by the transformer service the database change event queue to evaluate the second particular database change events to determine whether a second particular business object change has occurred, one or more of the second particular database changes indicating whether the second particular business object change has occurred;
  identifying by the transformer service the second particular business object change based on the one or more of the second particular database change events;
  streaming the second particular business object change to the business object change message queue;
  comparing by an event service the first business event definition against the business object change message queue, the business object change message queue containing the first particular business object change and against the second particular business object change, to determine whether the first business event trigger has been satisfied;
  when the first business event trigger has been satisfied, identifying the occurrence of the first business event associated with the first tenant;
  in response to identifying the first business event, informing a notification service of the occurrence of the first business event;
  providing a second interface by the notification service configured to receive a first notification definition and a notification action from the customer device of the first tenant, the first notification definition defining a first notification trigger based on an occurrence of one or more particular business events identified by the first tenant, the one or more particular business events including the first business event associated with the first tenant, the first notification definition being tenant-specific to only the first tenant;

monitoring the occurrence of the one or more particular business events identified by the first tenant; and when the first notification trigger has been satisfied, performing the notification action on behalf of the first tenant.

2. The multi-tenant computing system of claim 1, wherein the first business event trigger specifies:

the first tenant;

the one or more first business object changes; and one or more parameter thresholds for each of the one or more first business object changes.

3. The multi-tenant computing system of claim 1, wherein the first notification definition specifies:

the first tenant;

the notification action; and the one or more particular business events.

4. The multi-tenant computing system of claim 1, wherein the instructions that cause the multi-tenant computing system to perform the notification action comprises instructions that cause the multi-tenant computing system to send an email message, content of the email message identifying the first business event.

5. The multi-tenant computing system of claim 1, wherein the instructions further cause the multi-tenant computing system to perform:

providing an event definition application programming interface (API); and receiving, from the customer device of the first tenant, the first business event definition over the event definition API.

6. The multi-tenant computing system of claim 1, wherein the instructions further cause the multi-tenant computing system to perform:

providing a notification definition application programming interface (API); and receiving, from the customer device of the first tenant, the first notification definition of the first tenant over the notification definition API.

7. The multi-tenant computing system of claim 1, wherein each particular business object change occurring to the tenant data for the plurality of tenants comprises at least one of:

a row change in a table in the database; and a column change in the table in the database.

8. A method being implemented by a multi-tenant computing system including one or more physical processors and storage media storing machine-readable instructions, the method configured to enable each tenant of a plurality of tenants of the multi-tenant computing system to create tenant-specific business event definitions and notification triggers based on changes to tenant data specific to the tenant, the method comprising:

providing a database comprising tenant data for a plurality of tenants, the tenant data including first tenant data associated with a first tenant of the plurality of tenants;

providing a first interface configured to receive a first business event definition from a customer device of the first tenant, the first business event definition defining a first business event trigger based on one or more first business object changes identified by the first tenant and associated with the first tenant data, the one or more first business object changes defining an occurrence of a first business event associated with the first tenant, the first business event definition being tenant-specific to only the first tenant, the first business event trigger including one or more logical operations involving the one or more first business object changes;

streaming by a change data capture service a first stream portion of first particular database change events having occurred in the database to a database change event queue;

accessing by a transformer service the database change event queue to evaluate the first particular database change events to determine whether a first particular business object change has occurred, one or more of the first particular database change events indicating whether the first particular business object change has occurred;

identifying by the transformer service the first particular business object change based on the one or more of the first particular database change events;

streaming the first particular business object change to a business object change message queue;

streaming by the change data capture service a second stream portion of second particular database change events having occurred in the database to the database change event queue;

accessing by the transformer service the database change event queue to evaluate the second particular database change events to determine whether a second particular business object change has occurred, one or more of the second particular database changes indicating whether the second particular business object change has occurred;

identifying by the transformer service the second particular business object change based on the one or more of the second particular database change events;

streaming the second particular business object change to the business object change message queue;

comparing by an event service the first business event definition against the business object change message queue, the business object change message queue containing the first particular business object change and against the second particular business object change, to determine whether the first business event trigger has been satisfied;

when the first business event trigger has been satisfied, identifying the occurrence of the first business event associated with the first tenant;

in response to identifying the first business event, informing a notification service of the occurrence of the first business event;

providing a second interface by a notification service configured to receive a first notification definition and a notification action from the customer device of the first tenant, the first notification definition defining a first notification trigger based on an occurrence of one or more particular business events identified by the first tenant, the one or more particular business events including the first business event associated with the first tenant, the first notification definition being tenant-specific to only the first tenant;

monitoring the occurrence of the one or more particular business events identified by the first tenant; and when the first notification trigger has been satisfied, performing the notification action on behalf of the first tenant.

9. The method of claim 8, wherein the first business event trigger specifies:
the first tenant;
the one or more first business object changes; and
one or more parameter thresholds for each of the one or more first business object changes.

10. The method of claim 8, wherein the first notification definition specifies:
the first tenant;
the notification action; and
the one or more particular business events.

11. The method of claim 8, wherein performing the notification action comprises sending an email message, content of the email message identifying the first business event.

12. The method of claim 8, further comprising:
providing an event definition application programming interface (API); and
receiving, from the customer device of the first tenant, the first business event definition over the event definition API.

13. The method of claim 8, further comprising:
providing a notification definition application programming interface (API); and
receiving, from the customer device of the first tenant, the first notification definition of the first tenant over the notification definition API.

14. A non-transitory computer readable medium comprising instructions that, when executed, cause one or more processors of a multi-tenant computing system, to perform:
providing a database comprising tenant data for a plurality of tenants, the tenant data including first tenant data associated with a first tenant of the plurality of tenants;
providing a first interface configured to receive a first business event definition from a customer device of the first tenant, the first business event definition defining a first business event trigger based on one or more first business object changes identified by the first tenant and associated with the first tenant data, the one or more first business object changes defining an occurrence of a first business event associated with the first tenant, the first business event definition being tenant-specific to only the first tenant, the first business event trigger including one or more logical operations involving the one or more first business object changes;
streaming by a change data capture service a first stream portion of first particular database change events having occurred in the database to a database change event queue;
accessing by a transformer service the database change event queue to evaluate the first particular database change events to determine whether a first particular business object change has occurred, one or more of the first particular database change events indicating whether the first particular business object change has occurred;
identifying by the transformer service the first particular business object change based on the one or more of the first particular database change events;
streaming the first particular business object change to a business object change message queue;

streaming by the change data capture service a second stream portion of second particular database change events having occurred in the database to the database change event queue;
accessing by the transformer service the database change event queue to evaluate the second particular database change events to determine whether a second particular business object change has occurred, one or more of the second particular database changes indicating whether the second particular business object change has occurred;
identifying by the transformer service the second particular business object change based on the one or more of the second particular database change events;
streaming the second particular business object change to the business object change message queue;
comparing by an event service the first business event definition against the business object change message queue, the business object change message queue containing the first particular business object change and against the second particular business object change, to determine whether the first business event trigger has been satisfied;
when the first business event trigger has been satisfied, identifying the occurrence of the first business event associated with the first tenant;
in response to identifying the first business event, informing a notification service of the occurrence of the first business event;
providing a second interface by a notification service configured to receive a first notification definition and a notification action from the customer device of the first tenant, the first notification definition defining a first notification trigger based on an occurrence of one or more particular business events identified by the first tenant, the one or more particular business events including the first business event associated with the first tenant, the first notification definition being tenant-specific to only the first tenant;
monitoring the occurrence of the one or more particular business events identified by the first tenant; and
when the first notification trigger has been satisfied, performing the notification action on behalf of the first tenant.

15. The non-transitory computer readable medium of claim 14, wherein the first business event trigger specifies:
the first tenant;
the one or more first business object changes; and
one or more parameter thresholds for each of the one or more first business object changes.

16. The non-transitory computer readable medium of claim 14, wherein the first notification definition specifies:
the first tenant;
the notification action; and
the one or more particular business events.

17. The non-transitory computer readable medium of claim 14, wherein performing the notification action comprises sending an email message, content of the email message identifying the first business event.

18. The non-transitory computer readable medium of claim 14, wherein the instructions further cause the one or more processors to perform:
providing an event definition application programming interface (API); and
receiving, from the customer device of the first tenant, the first business event definition over the event definition API.

19. The non-transitory computer readable medium of claim 14, wherein the instructions further cause the one or more processors to perform:
- providing a notification definition application programming interface (API); and
- receiving, from the customer device of the first tenant, the first notification definition of the first tenant over the notification definition API.

20. The non-transitory computer readable medium of claim 14, wherein each particular business object change occurring to the tenant data for the plurality of tenants comprises at least one of:
- a row change in a table in the database; and
- a column change in the table in the database.

* * * * *